United States Patent [19]
Wisler

[11] 3,989,554
[45] Nov. 2, 1976

[54] COMPOSITE HARDFACING OF AIR HARDENING STEEL AND PARTICLES OF TUNGSTEN CARBIDE

[75] Inventor: Allen E. Wisler, Houston, Tex.

[73] Assignee: Hughes Tool Company, Houston, Tex.

[22] Filed: Apr. 25, 1975

[21] Appl. No.: 571,447

Related U.S. Application Data

[63] Continuation-in-part of Ser. No. 370,877, June 18, 1973, abandoned.

[52] U.S. Cl.............................. 285/333; 29/182.8; 29/195; 75/126 C; 148/34; 148/31.5; 175/374
[51] Int. Cl.².................. C22B 38/04; E21C 13/00
[58] Field of Search.................. 148/31.0, 31.5, 34; 29/182.7, 182.8, 195 A; 75/203, 123 R, 126 C, 126 E, 126 R; 106/43; 427/423; 175/374

[56] References Cited
UNITED STATES PATENTS

| | | | |
|---|---|---|---|
| 1,496,979 | 6/1924 | Corning | 75/126 R |
| 3,092,491 | 6/1963 | Payson et al. | 75/126 C |
| 3,215,510 | 11/1965 | Kelly et al. | 29/182.8 |
| 3,260,579 | 7/1966 | Scales et al. | 29/195 |
| 3,380,861 | 4/1968 | Frehn | 148/31 |
| 3,819,364 | 6/1974 | Frehn | 29/182.7 |

FOREIGN PATENTS OR APPLICATIONS 908,412   10/1962   United Kingdom............... 75/123 R Primary Examiner—Walter R. Satterfield
Attorney, Agent, or Firm—Robert A. Felsman

[57] ABSTRACT

A metallurgical composition especially suitable for use as a hardfacing to increase the wear resistance of manufactured articles, such as for example tool joints used in earth drilling operations. This composition has cemented tungsten carbide particles dispersed in a matrix of air hardening alloy steel. Included in the alloy steel are carbon, chromium, molybdenum and vanadium. For weldability, manganese and silicon are added. Also disclosed are suitable ranges of proportions of constituents.

8 Claims, 2 Drawing Figures

COMPOSITE HARDFACING OF AIR HARDENING STEEL AND PARTICLES OF TUNGSTEN CARBIDE

CROSS REFERENCES TO RELATED APPLICATIONS

This is a continuation-in-part of application Ser. No. 370,877, filed June 18, 1973, and now abandoned.

BACKGROUND OF THE INVENTION

1. Field of the Invention

This invention relates in general to metallurgical compositions useful as hardfacing materials, and in particular to improvements in composite hardfacing materials utilizing particles of tungsten carbide dispersed in a steel matrix.

2. Description of the Prior Art

Hardfacing compositions consisting of macroscopic tungsten carbide particles dispersed in a metal matrix have long been used to increase the wear resistance of manufactured articles. This general form of hardfacing material has been used in the earth boring industry on drill bits and on tool joint connectors of drill pipe.

There are two general types of tungsten carbide particles: (1) cast particles and (2) cemented or sintered particles.

Cast tungsten carbide particles are substantially pure tungsten carbide, having a hardness on the Knoop Scale of approximately 2700 and a melting temperature of approximately 5000° F.

Cemented or sintered tungsten carbide particles are a composition of microscopic primarily monotungsten, carbide and a binder metal selected from one or more of Group IV elements of the Periodic Table, namely iron, nickel and cobalt. The most commonly used binder is cobalt, which has a melting temperature and a resulting particle sintering temperature of about 2730° F. The hardness of cemented tungsten carbide particles varies with the binder selected and with the percentage of binder used in relation to that of the tungsten carbide. Normally, the hardness of these particles ranges from 1400 to 1800 on the Knoop Scale.

In applying tungsten carbide particles to the matrix during the manufacturing process, a large number of macroscopic particles are only slightly embedded within, and thus protrude extensively from, the surface of the matrix. Such particles wear or fracture easily during drilling. To overcome this problem, a hand-held torch is sometimes used to wet the matrix at its outer surface to enable improved particle bonding with, and submergence within, the matrix. Hence the density of particles at the surface of the matrix increases, as does wear resistance. Also, bonding between the particles and matrix is improved. This is known as the "densification" technique, and proves satisfactory when using cast tungsten carbide particles, the melting temperature of which (5000° F.) is sufficiently high to avoid damage by the heat generated with the torch.

Before the present invention, it was discovered that cemented tungsten carbide particles are surprisingly superior in some instances to cast tungsten carbide particles in a heat treated alloy steel matrix, even though they are softer and exhibit a lower tolerance for high temperatures. They are superior when used as ground gage surfaces of rolling cutter rock bits, for example. Unfortunately, cemented tungsten carbide particles cannot be utilized with the above described densification technique to increase the particle bonding and density in unground wear surfaces of tool joints, since the heat generated by the torch often exceeds the sintering temperature (2650°–2700° F.) of the particles. Exceeding this sintering temperature detrimentally alters the metallurgical composition of the cemented particles. As a consequence, the surprising improvement obtained with cemented tungsten carbide particles in an alloy steel matrix in drill bits has not been realized in tool joints because the tool joint hardfacing cannot be heat treated as it is in the case of the drill bit. Also the densification technique, used with cast carbide at the unground surface to gain additional wear resistance, cannot be used. Grinding of tool joint wear resistant surfaces to reach a layer of dense, well bonded particles is not economically feasible at this time.

SUMMARY OF THE INVENTION

This invention is a superior composite hardfacing of cemented or sintered tungsten carbide particles in an air hardening alloy steel matrix. Its superiority obviates the necessity for utilizing the densification technique or grinding. Improved wear resistance is achieved with the composite material even though the surface particles are not all fully and completely bonded at the surface of the matrix. The composite material has tungsten carbide particles of the cemented or sintered type dispersed in a matrix of air hardening alloy steel. Included in the alloy steel are carbon, chromium, molybdenum, and vanadium. For better weldability, manganese and silicon are added. Satisfactory ranges and preferred percentages of the constituents are provided in the following detailed description.

DESCRIPTION OF THE PREFERRED EMBODIMENT

Figure 1:
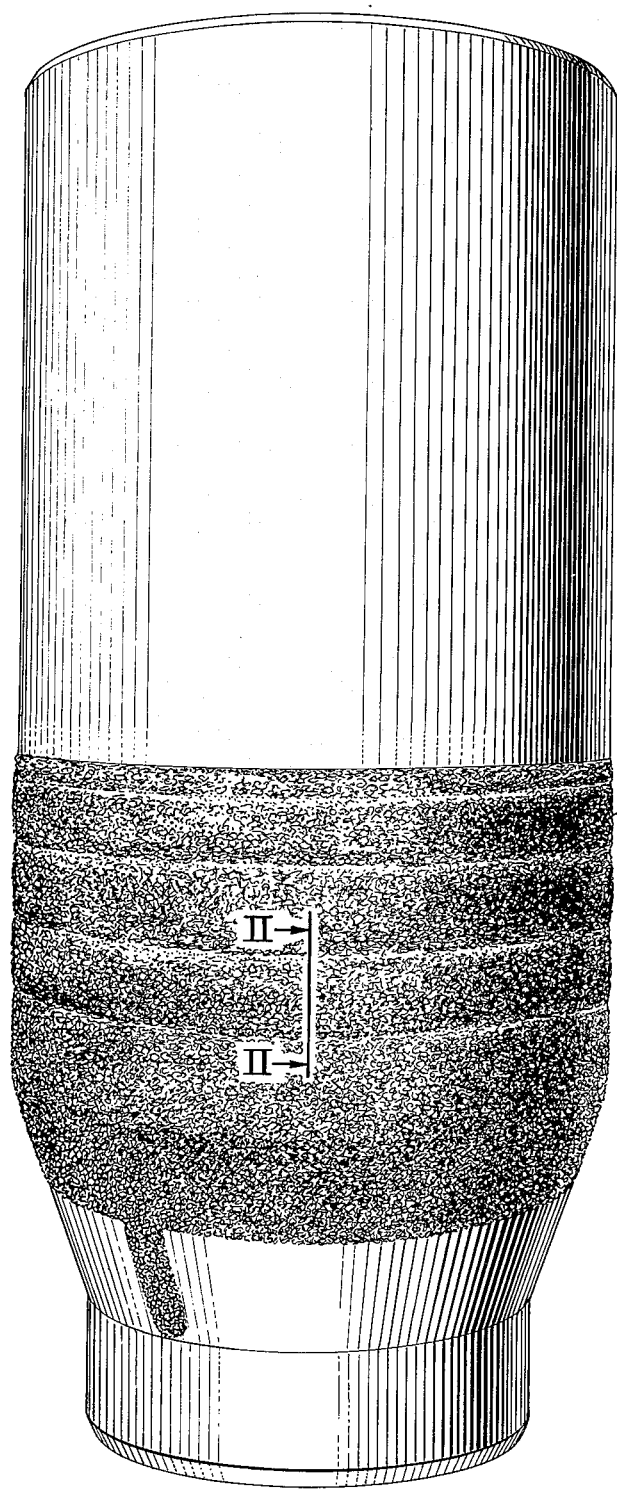
FIG. 1 is a perspective view of a tool joint member or "box" used to secure lengths of drill pipe together during earth boring operations.

The numeral 11 in the drawing designates a tool joint member called a box which is threaded internally (not shown) to receive a mating "pin" member. These box and pin members are secured by suitable means such as welding to opposite ends of a length of pipe, thus forming a "joint" of drill pipe used in the rotary earth drilling process to suspend, support and rotate a drill bit and produce a borehole.

Figure 2:
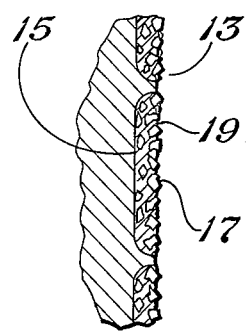
FIG. 2 is a fragmentary longitudinal section as seen looking along the lines II—II of FIG. 1.

For the purpose of increasing the wear resistance of the tool joint box disclosed in FIG. 1, bands 13 of hard facing material are deposited by welding in circumferentially extending grooves 15 (see FIG. 2). Each band of hardfacing is filled with a composite, wear resistant material consisting of macroscopic particles 17 of cemented or sintered tungsten carbide dispersed in an air hardening, alloy steel matrix 19. The particles and matrix are deposited in the grooves in one of the well known prior art techniques. In one technique a continuous wire of low alloy steel, connected to a suitable welding power source, arcs off the tool joint surface to produce a molten alloy steel deposit. Simultaneously, tungsten carbide particles are fed by gravity into the molten steel (matrix). Alternatively, the end of a hollow tube of steel filled with tungsten carbide particles may be heated with a welding torch to deposit the matrix and particles simultaneously within the grooves.

The alloy steel used for matrix in the invention is an air hardening steel having carbon, chromium, molybdenum and vanadium to provide the air hardening characteristics. To increase weldability manganese and silicon are added.

Suitable ranges for the air hardening constituents are:

| Element | Range | Preferred |
|---|---|---|
| carbon | 0.40–0.70% (by weight) | 0.45–0.55% (by weight) |
| chromium | 4.0–6.0% | 5.0–5.25% |
| molybdenum | 1.00–2.00% | 1.4–1.6% |
| vanadium | 0.30–0.80% | 0.45–0.55% |
| iron | Balance | |

Suitable ranges of the constituents for increasing weldability are:

| Element | Range | Preferred |
|---|---|---|
| manganese | 0.40–0.80% (by weight) | 0.50–0.75% (by weight) |
| silicon | 0.40–0.80% | 0.40–0.50% |
| iron | Balance | |

The sintered tungsten carbide particles include a selected one of the Group IV binders, which should be in a range from 3 to 15% (by weight), the balance being microscopic particles of essentially pure tungsten carbide. The binder may be either iron, nickel, or cobalt, or can be various combinations of these binders. Preferably, the microscopic particles have approximately 6% cobalt, the balance being monotungsten carbide. The microscopic tungsten carbide particles can be a mixture of monotungsten and ditungsten, with ditungsten carbide of about 30% (by weight), and of a balance being monotungsten carbide. The resulting composite hardfacing should contain about 60% by weight tungsten carbide particles (range of about 56 to 64%), the balance being alloy steel matrix. The sintered particles are preferably rounded and roughly spherical, having a macroscopic size preferably within a range of 0.023 to 0.055 inch in cross-sectional dimension.

While the invention has been shown in only one of its forms, it should be apparent to those skilled in the art that it is not so limited but is susceptible to various changes and modifications without departing from the spirit thereof.

I claim:

1. In a joint of drill pipe for rotary earth drilling having tool joint members on each end with threaded connections for connecting the joints with other joints of drill pipe, an improved hardfacing on the tool joint members comprising a heterogeneous composite material consisting of sintered macroscopic tungsten carbide particles in an amount effective for abrasion resistance and consisting of microscopic carbides of tungsten in a binder selected from the class consisting of iron, nickel, cobalt, and combinations thereof, and an air hardening steel matrix consisting essentially of constituents with following proportions by weight:

| carbon | 0.40–0.70% |
|---|---|
| chromium | 4.0–6.0 |
| molybdenum | 1.00–2.00% |
| vanadium | 0.30–0.80% |
| iron | balance, | to form microscopic carbides of chromium, molybdenum and vanadium to support the macroscopic particles of sintered tungsten carbide.

2. The hardfacing of claim 1 wherein said matrix has additional constituents consisting essentially of the following proportions by weight:

| manganese | 0.40–0.80% |
|---|---|
| silicon | 0.40–0.80%. |

3. In a joint of drill pipe for rotary earth drilling having tool joint members on each end with threaded connections for connecting the joints with other joints of drill pipe, an improved hardfacing on the tool joint members comprising a heterogeneous composite material consisting of an air hardening alloy steel and sintered tungsten carbide particles constituting about 60% by weight of the total composition and consisting of carbides of tungsten in a binder selected from the class consisting of iron, nickel, cobalt or combinations thereof which constitutes from 3 to 15% by weight of the particles, the majority of the particle sizes being in a range of about 0.023 to 0.055 inch, said air hardening alloy steel consisting essentially of constituents in the following proportions by weight:

| carbon | 0.40–0.70% |
|---|---|
| chromium | 4.0–6.0% |
| molybdenum | 1.00–2.00% |
| vanadium | 0.30–0.80% |
| iron | balance, | to form microscopic carbides of chromium, molybdenum and vanadium to support the macroscopic particles of sintered tungsten carbide.

4. The article of claim 3 wherein said matrix has additional constituents consisting essentially of the following proportions by weight:

| manganese | 0.40–0.80% |
|---|---|
| silicon | 0.40–0.80%. |

5. In a joint of drill pipe for rotary earth drilling having tool joint members on each end with threaded connections for connecting the joints with other joints of drill pipe, an improved hardfacing on the tool joint members comprising a heterogeneous composite material consisting of sintered tungsten carbide particles in an amount effective for abrasion resistance and consisting of carbides of tungsten in a binder selected from the class consisting of iron, nickel, cobalt, and combinations thereof, and an air hardening steel matrix, consisting essentially of constituents with following proportions by weight:

| carbon | 0.40–0.70% |
|---|---|
| chromium | 4.0–6.0% |

-continued

| | |
|---|---|
| molybdenum | 1.00–2.00% |
| vanadium | 0.30–0.80% |
| iron | balance. |

6. The hardfacing of claim 5 wherein said matrix has additional constituents consisting essentially of the following proportions by weight:

| | |
|---|---|
| manganese | 0.40–0.80% |
| silicon | 0.40–0.80%. |

7. In a joint of drill pipe for rotary earth drilling having tool joint members on each end with threaded connections for connecting the joints with other joints of drill pipe, an improved hardfacing on the tool joint members comprising a heterogeneous composite material consisting of an air hardening alloy steel and sintered macroscopic tungsten carbide particles in a range of 56 to 64% by weight of the total composition and consisting of microscopic carbides of tungsten in a binder selected from the class consisting of iron, nickel, cobalt or combinations thereof which constitutes from 3 to 15% by weight of the particles, said air hardening alloy steel consisting essentially of constituents in the following proportions by weight:

| | |
|---|---|
| carbon | 0.40–0.70% |
| chromium | 4.0–6.0% |
| molybdenum | 1.00–2.00% |
| vanadium | 0.30–0.80% |
| iron | balance, | to form microscopic carbides of chromium, molybdenum and vanadium to support the macroscopic particles of sintered tungsten carbide.

8. The articles of claim 7 wherein said matrix has additional constituents consisting essentially of the following proportions by weight:

| | |
|---|---|
| manganese | 0.40–0.80% |
| silicon | 0.40–0.80%. |

* * * * *